US011773530B2

(12) United States Patent
Galloway et al.

(10) Patent No.: US 11,773,530 B2
(45) Date of Patent: Oct. 3, 2023

(54) LAUNDRY APPLIANCE UTILIZING A PERMANENT SPLIT CAPACITOR MOTOR HAVING A SENSOR FOR PROVIDING TEMPERATURE CONTROL WITHIN THE APPLIANCE

(71) Applicant: WHIRLPOOL CORPORATION, Benton Harbor, MI (US)

(72) Inventors: Beau D. Galloway, Niles, MI (US); Eduardo Abraham Lopez, St. Joseph, MI (US); Jason R. Savage, St. Joseph, MI (US); Jeffrey F. Landrey, Cicero, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 204 days.

(21) Appl. No.: 17/314,311

(22) Filed: May 7, 2021

(65) Prior Publication Data
US 2021/0262151 A1 Aug. 26, 2021

Related U.S. Application Data

(63) Continuation of application No. 16/402,444, filed on May 3, 2019, now Pat. No. 11,035,074.

(51) Int. Cl.
| *D06F 58/30* | (2020.01) |
| *H02K 17/08* | (2006.01) |
| *H02K 11/27* | (2016.01) |
| *H02P 25/04* | (2006.01) |
| *D06F 103/00* | (2020.01) |
| *D06F 103/34* | (2020.01) |
| *D06F 103/44* | (2020.01) |

(Continued)

(52) U.S. Cl.
CPC ............. *D06F 58/30* (2020.02); *H02K 11/27* (2016.01); *H02K 17/08* (2013.01); *H02P 25/04* (2013.01); *D06F 2103/00* (2020.02); *D06F 2103/34* (2020.02); *D06F 2103/44* (2020.02); *D06F 2105/28* (2020.02); *D06F 2105/46* (2020.02)

(58) Field of Classification Search
CPC .. D06F 58/30; D06F 2103/00; D06F 2103/34; D06F 2103/44; D06F 2103/32; D06F 2103/46; D06F 2105/28; D06F 2105/46; D06F 2105/20; D06F 2105/30; D06F 58/38; H02K 11/27; H02K 17/08; H02P 25/04; H02P 1/44
USPC ........................................... 34/476; 361/187
See application file for complete search history.

(56) References Cited

U.S. PATENT DOCUMENTS

| 3,309,783 A | 3/1967 | Worst |
| 3,579,050 A * | 5/1971 | Basu ...................... H02H 3/202 |
| | | 361/198 |

(Continued)

*Primary Examiner* — John P McCormack
(74) *Attorney, Agent, or Firm* — Price Heneveld LLP

(57) ABSTRACT

A laundry appliance includes a blower that selectively delivers process air through an airflow path. A rotating drum defines a portion of the airflow path. The rotating drum is attached to a drive shaft that rotates the rotating drum about a rotational axis. The blower and the drive shaft are operated by a common motor. A heater selectively delivers heat to the airflow path. The heater defines an energizing state when a motor current delivered to the common motor is within a predetermined motor current range that is indicative of the common motor operating. The heater defines an idle state when the motor current is outside of the predetermined motor current range.

19 Claims, 6 Drawing Sheets

(51) Int. Cl.
    *D06F 105/28*     (2020.01)
    *D06F 105/46*     (2020.01)

(56) References Cited

U.S. PATENT DOCUMENTS

| | | | |
|---|---|---|---|
| 4,806,838 A | | 2/1989 | Weber |
| 5,006,778 A | | 4/1991 | Bashark |
| 5,281,956 A | * | 1/1994 | Bashark .................. H02P 25/04 |
| | | | 340/660 |
| 5,555,645 A | | 9/1996 | Joslin |
| 5,883,490 A | | 3/1999 | Moreira |
| 6,215,214 B1 | | 4/2001 | Fisher et al. |
| 6,445,101 B2 | | 9/2002 | Ley |
| 8,104,191 B2 | | 1/2012 | Ricklefs et al. |
| 8,615,897 B2 | | 12/2013 | Wehrheim et al. |
| 9,493,903 B2 | | 11/2016 | Yu et al. |
| 2011/0010961 A1 | * | 1/2011 | Wehrheim .............. D06F 58/04 |
| | | | 318/807 |
| 2011/0146102 A1 | * | 6/2011 | Bellinetto .............. G01K 13/00 |
| | | | 700/275 |
| 2011/0296702 A1 | | 12/2011 | Pillot et al. |
| 2015/0368852 A1 | | 12/2015 | Rockwell et al. |
| 2016/0298282 A1 | * | 10/2016 | Forman ................... D06F 34/10 |
| 2019/0153659 A1 | | 5/2019 | Prajescu |
| 2020/0217007 A1 | | 7/2020 | Kim et al. |

* cited by examiner

LAUNDRY APPLIANCE UTILIZING A PERMANENT SPLIT CAPACITOR MOTOR HAVING A SENSOR FOR PROVIDING TEMPERATURE CONTROL WITHIN THE APPLIANCE

CROSS-REFERENCE TO RELATED APPLICATION

The present application is a continuation of U.S. patent application Ser. No. 16/402,444 filed May 3, 2019, now U.S. Pat. No. 11,035,074, entitled LAUNDRY APPLIANCE UTILIZING A PERMANENT SPLIT CAPACITOR MOTOR HAVING A SENSOR FOR PROVIDING TEMPERATURE CONTROL WITHIN THE APPLIANCE, the entire disclosure of which is hereby incorporated herein by reference.

FIELD OF THE DEVICE

The device is in the field of laundry appliances, and more specifically, a laundry appliance that includes an electric motor and a sensor that monitors an electrical current for at least partially controlling the temperature of air delivered through the appliance.

SUMMARY OF THE DEVICE

According to one aspect of the present disclosure, a laundry appliance includes a blower that operates to selectively deliver process air through an airflow path. A drive shaft rotates about a rotational axis to operate a rotating drum. The rotating drum defines a portion of the airflow path. A permanent split capacitor motor selectively activates to operate the blower and the drive shaft. A heater is in communication with the airflow path that selectively delivers heat to the airflow path. The heater defines an energizing state when the permanent split capacitor motor includes a motor current having a motor current level that is above a first threshold current and below a second threshold current.

According to another aspect of the present disclosure, a laundry appliance includes a blower that selectively delivers process air through an airflow path. A rotating drum defines a portion of the airflow path. The rotating drum is attached to a drive shaft that rotates the rotating drum about a rotational axis. The blower and the drive shaft are operated by a common motor. A heater selectively delivers heat to the airflow path. The heater defines an energizing state when a motor current delivered to the common motor is within a predetermined motor current range that is indicative of the common motor operating. The heater defines an idle state when the motor current is outside of the predetermined motor current range.

According to yet another aspect of the present disclosure, a method for operating a heater for a laundry appliance includes detecting a level of a motor current delivered to a permanent split capacitor motor that contemporaneously drives a blower and a rotating drum. The heater is energized to define an energizing state when the level of the motor current is above a first threshold current indicative of the permanent split capacitor motor operating and below a second threshold current indicative of a stalled condition of the permanent split capacitor motor. The heater is activated when in the energizing state and when an activation signal is delivered to the heater.

These and other features, advantages, and objects of the present disclosure will be further understood and appreciated by those skilled in the art by reference to the following specification, claims, and appended drawings.

Figure 1:
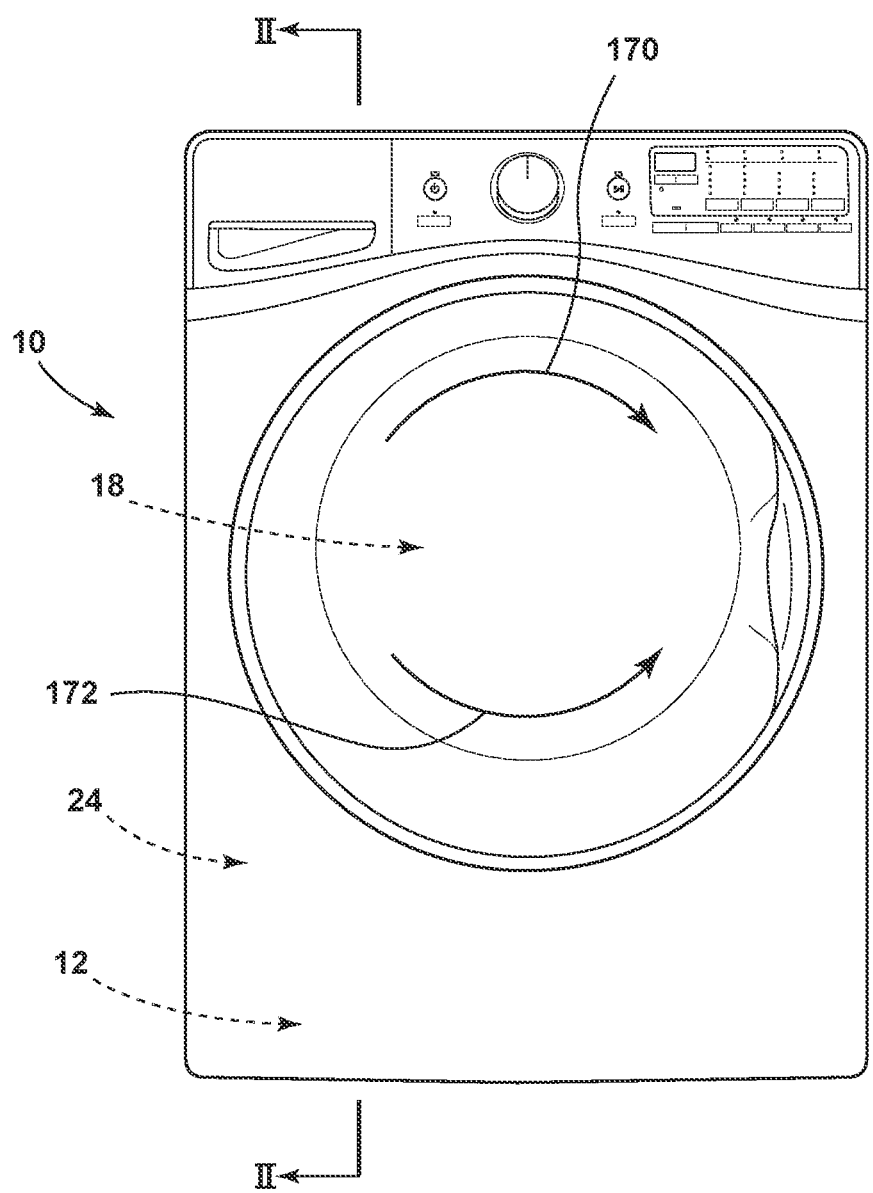
FIG. 1 is a front elevational view of a laundry appliance that incorporates an aspect of the temperature control system.

The components in the figures are not necessarily to scale, emphasis instead being placed upon illustrating the principles described herein.

DETAILED DESCRIPTION

The present illustrated embodiments reside primarily in combinations of method steps and apparatus components related to a laundry appliance that includes an electrical control for a heating element. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With respect to FIGS. 1-6, reference numeral 10 generally refers to a laundry appliance, typically a dryer or combination washer/dryer that can be used for removing moisture from damp articles placed within the appliance 10. According to various aspects of the device, the laundry appliance 10 includes a blower 12 that selectively delivers process air 14 through an airflow path 16 defined within the laundry appliance 10. A rotating drum 18, that defines a portion of the airflow path 16, rotates about a rotational axis 20. The rotating drum 18 is attached to a drive shaft 22 that rotates the rotating drum 18 about the rotational axis 20. The blower 12 and the drive shaft 22 are operated by a common motor 24. A heater 26 is included within the appliance 10 and selectively delivers heat 28 to the airflow path 16. The heater 26 defines an energizing state 30 when a motor current 32 delivered to the common motor 24 is within a predetermined motor current range 34. This predetermined motor current range 34 is indicative of a common motor 24 operating according to a particular laundry cycle. The heater 26 is also configured to define an idle state 36. In this idle state 36, the motor current 32 delivered to the common motor 24 is outside of the predetermined motor current range 34. Accordingly, the heater 26, typically an electrically resistive heater 26, is adapted to be in an energizing state 30 when the common motor 24 operates the drum 18 and the blower 12 under typical operating conditions. Where the common motor 24 is not in a typical operating condition, or is operating, but not causing the drum 18 or the blower 12 to be operated, the motor current 32 delivered to the common motor 24 may increase to a current level 80 outside of the predetermined motor current range 34. In this condition of an elevated motor current 32, a current sensor 38 for directly or indirectly monitoring a level 80 of the motor current 32 provides a deactivation signal 40 to place the heater 26 in the idle state 36.

Referring again to FIGS. 1-6, the motor that serves as the common motor 24 for operating the rotating drum 18 and the blower 12 is typically a permanent split capacitor (PSC) motor 50 that is configured to operate each of the rotating drum 18 and the blower 12. Typically, the PSC motor 50 is attached to a portion of the tub 52 or other structure that surrounds the rotating drum 18. A linkage 54, such as a belt or other similar linkage 54, extends from the PSC motor 50 and to the drive shaft 22 that rotates the rotating drum 18. It is contemplated that the PSC motor 50 operates both the drive shaft 22 and the blower 12 when the PSC motor 50 is activated. The PSC motor 50 is configured to receive the motor current 32 in the form of an electrical current that is typically within the predetermined motor current range 34. This predetermined motor current range 34 is defined by a level 80 of a motor current 32 that is above a first threshold current 56 and below a second threshold current 58. When the motor current 32 is within this predetermined motor current range 34, the heater 26 is configured to be in the energizing state 30. The energizing state 30 of the heater 26 is a condition where the heater 26 is ready to receive an activation signal 60 for delivering heat 28 to or into the airflow path 16.

The activation signal 60 can typically be received by a thermostat, thermocouple, thermistor, or other similar temperature sensor 70 that monitors a temperature of the airflow path 16, the process air 14 and/or the processing chamber 72 within the rotating drum 18. When the temperature sensor 70 determines that the temperature within a particular portion of the appliance 10 is below a target temperature, the temperature sensor 70 can provide a signal to a controller 74, which then provides the activation signal 60 to the heater 26. The activation signal 60 then activates the heater 26 by providing an electrical current through the electrically resistive heater 26. The electrically resistive heater 26 then provides radiant heat 28 to portions of the airflow path 16. It is also contemplated that the temperature sensor 70 can provide the activation signal 60 directly to the heater 26 while in the energizing state 30.

Figure 6:
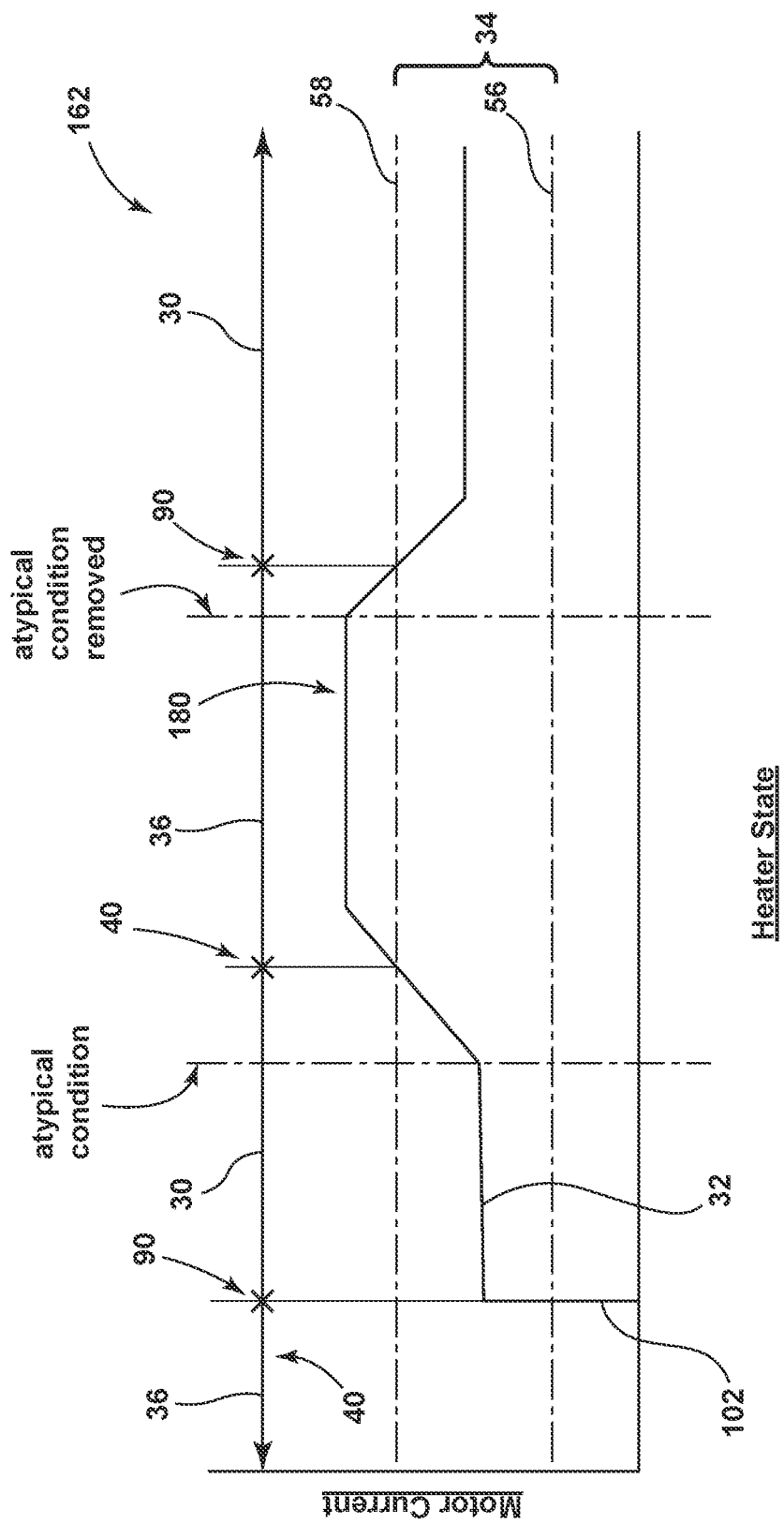
FIG. 6 is a schematic diagram illustrating operation of the heater based upon the level of the motor current delivered to the permanent split capacitor motor.
Figure 7:
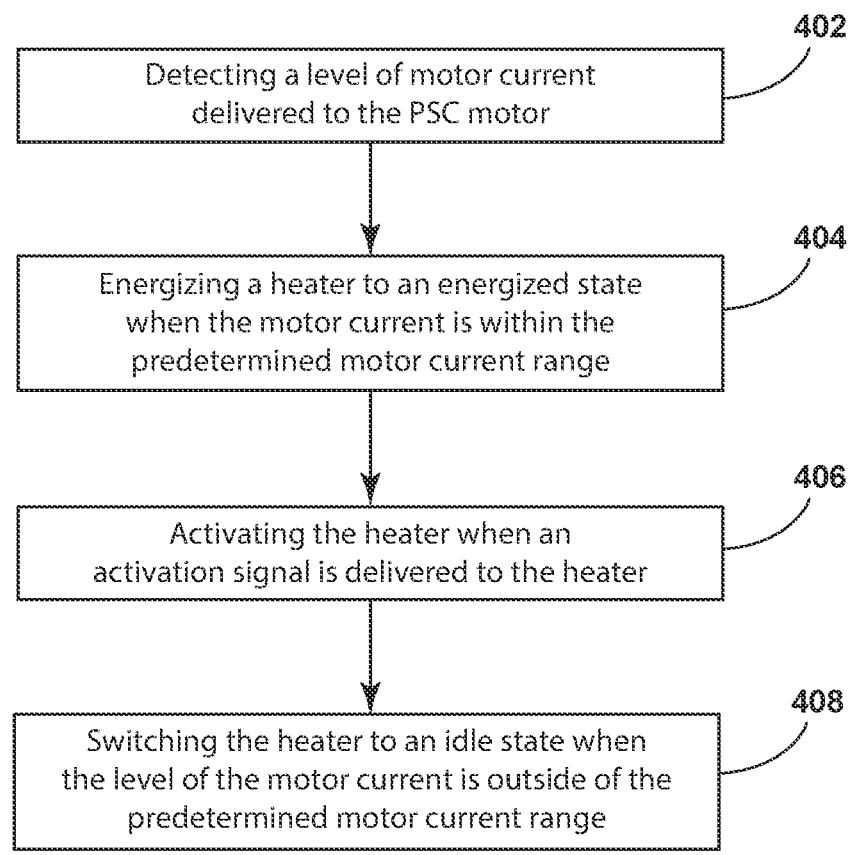
FIG. 7 is a linear flow diagram illustrating a method for controlling a temperature of process air within the laundry appliance.

As exemplified in FIG. 6, when the motor current 32 is at a level 80 that is above a predetermined motor current range 34, this condition is typically indicative of the common motor 24, typically the PSC motor 50, receiving a motor current 32 but not operating the rotating drum 18 and/or the blower 12. This lack of operation can be due to various conditions, such as a blockage within the rotating drum 18 or the blower 12, an overloaded condition of the rotating drum 18, a malfunction within the appliance 10, or other similar condition that prevents operation of the rotating drum 18 and/or the blower 12. Where the rotating drum 18 and/or blower 12 are not operating while the motor current 32 is delivered to the common motor 24, the level 80 of motor current 32 delivered to the common motor 24 typically increases. To detect this increase in the motor current 32 beyond the predetermined motor current range 34 (at or above the second threshold current 58), a current sensor 38 is included for monitoring this condition of the motor current 32. The current sensor 38 is configured to detect a presence of the motor current 32 that is delivered to the common motor 24. The current sensor 38 also detects a level 80 of the motor current 32 in relation to the predetermined motor current range 34. When the current sensor 38 detects that the motor current 32 is above the predetermined motor current range 34, the current sensor 38, either directly or indirectly, sends the deactivation signal 40 to the heater 26 to move to the idle state 36. In the idle state 36, the heater 26 is unable to be activated by the activation signal 60.

According to various aspects of the device, when the heater 26 is in the idle state 36, the heater 26 may receive activation signals 60 from the temperature sensor 70 that is in communication with the airflow path 16. However, because the heater 26 is in the idle state 36, these activation signals 60 do not result in any activation or other operation of the heater 26. It is also contemplated that when the heater 26 is in the idle state 36, this may also result in the temperature sensor 70 also remaining idle until such time as the motor current 32 returns to a level 80 that is within the predetermined motor current range 34.

Referring again to FIG. 5, according to various aspects of the device, the PSC motor 50 is coupled with the current sensor 38. This current sensor 38 can be placed in communication with each of the heater 26 and the PSC motor 50. When the motor current 32 delivered to the PSC motor 50 is within the predetermined motor current range 34, the current sensor 38 can provide an energizing signal 90 to a heater enable actuator 92 that places the heater 26 in the energizing state 30. As discussed above, the energizing state 30 is a condition of the heater 26 that is able to be activated through an activation signal 60 delivered from the controller 74 and/or the temperature sensor 70 of the appliance 10. In the energizing state 30, the activation signal 60 can be delivered to a heater actuator 94 that is able to activate the heater 26 to deliver heat 28 to the airflow path 16 for the appliance 10. When either of the heater enable actuator 92 or the heater actuator 94 are switched in an off condition, the heater 26 remains deactivated.

Referring again to FIG. 5, the current sensor 38 is coupled with the PSC motor 50. The PSC motor 50, in turn, is connected with a motor actuator 100. When the motor actuator 100 receives an operating signal 102 from a control, the motor actuator 100 is switched on and motor current 32 is delivered through the motor actuator 100 and to the PSC motor 50 via the current sensor 38. As discussed above, the current sensor 38 periodically or continuously monitors the motor current 32 delivered to the PSC motor 50. Where the motor current 32 is maintained within the predetermined motor current range 34, the heater enable actuator 92 is switched on such that the heater 26 is in the energizing state 30. Additionally, where the motor current 32 is within the predetermined motor current range 34, the circuit 162 that operates the PSC motor 50 and the heater 26 generates a pulsing output 110 that drives a charge pump circuit 112. This charge pump circuit 112, in turn, drives the enable relay coil. Typically, the enable relay coil will be in the form of the heater enable actuator 92 that can be selectively activated and deactivated to place the heater 26 in the idle state 36 or the energizing state 30. As discussed previously, if the motor current 32 exceeds the predetermined motor current range 34, the current sensor 38 will sense this condition and prevent the heater enable actuator 92 from switching to an "on" condition.

According to various aspects of the device, to provide for operation of the heater actuator 94, the heater enable actuator 92 and motor actuator 100, these actuators are typically in the form of inductive relays 120. Accordingly, to activate the various actuators of the circuit 162, an electrical current is delivered to an inductor. This electrical current generates a magnetic field around the conductor that operates the actuator switch 122 of the actuator between the open and closed positions. An interruption in the electrical current delivered to the relay will serve to switch off the various actuators and prevent operation of one or more components of the circuit 162.

Referring to FIGS. 1-6, as discussed previously, the common motor 24 is typically in the form of a PSC motor 50 that is configured to simultaneously operate the blower 12 and the rotating drum 18 during operation of the PSC motor 50. The PSC motor 50 includes a primary winding 130 and an auxiliary winding 132 that is coupled with a capacitor 134. The primary and auxiliary windings 130, 132 are wound around poles 142 of a stator 144 in a particular sequence or pattern. During operation of the PSC motor 50, the capacitor 134 charges and periodically releases this charge to provide electrical capacitor current 136 to the auxiliary winding 132. This capacitor current 136 is delivered to the auxiliary winding 132 in a sequence that operates in conjunction with the primary winding 130 for rotating a rotor 146 that is coupled with the drive shaft 22 and the blower 12. Accordingly, the PSC motor 50 does not include a start winding. Additionally, the PSC motor 50 is configured such that the PSC motor 50 can operate the rotor 146 and, in turn, the drive shaft 22 in both counterclockwise and clockwise directions 172, 170. Accordingly, the rotating drum 18 can be operated in each of these rotational directions to accomplish varying manipulations of the load of laundry contained within the processing chamber 72 of the rotating drum 18. Typically, the capacitor 134 that is coupled with the auxiliary winding 132 is attached to a housing 138 of the PSC motor 50. Accordingly, the PSC motor 50 can define a substantially compact assembly that can be disposed within the cabinet for the appliance 10. Additionally, the use of the PSC motor 50 is typically free of or does not include a centrifugal actuator and switch. Because of the absence of the centrifugal actuator switch 122, the use of the current sensor 38 for operating the heater 26 can be used.

According to various aspects of the device, the PSC motor 50 described herein can be used in a retrofit or aftermarket configuration as a replacement motor over a split phase motor that is typically included within conventional laundry dryers. During manufacture, the split phase motor typically includes a set of attachment points 150 that allows for connection of the split phase motor with the tub 52 or other structure of the laundry appliance 10. The PSC motor 50 disclosed herein includes a similar fastening configuration that can attach with the same attachment points 150 on the tub 52 or other structure of the appliance 10. Accordingly, the PSC motor 50 can be designed as an aftermarket component that can be installed within a previously purchased appliance 10. Along with removing the split phase motor and installing the PSC motor 50, the controls and circuitry described above are also installed in aftermarket controllers 74 for operating the appliance 10.

By removing the split phase motor, the centrifugal actuator and switch are no longer needed. These components, which rely upon mechanically operable tabs that operate according to a centrifugal force may fail or otherwise malfunction during operation of the appliance 10. The use of the current sensor 38 provides for an electronic control 160 that can be used in conjunction with the main board of the dryer for controlling the various components of the appliance 10, including the motor, heater 26 and rotating drum 18. By using the electronic control 160 on the main board of the dryer, the reliability of the dryer itself is increased. Additionally, the use of a centrifugal actuator and switch typically produces a certain amount of noise and sound as a result of the operation of the centrifugal mechanical operating system of the centrifugal actuator. By removing this mechanical actuator in favor of the electronic control 160, various sounds and extraneous noise can be eliminated during operation of the appliance 10.

Referring again to FIGS. 1-6, the laundry appliance 10 includes the blower 12 that operates to selectively deliver process air 14 through the airflow path 16. The drive shaft 22 rotates about the rotational axis 20 to operate the rotating drum 18. As discussed above, the rotating drum 18 typically defines a portion of the airflow path 16. The PSC motor 50 selectively activates to operate the blower 12 and the drive shaft 22 for the rotating drum 18. The heater 26 is in communication with the airflow path 16 and selectively delivers heat 28 to the airflow path 16 when the heater 26 is in each of the energizing state 30 and the activated state. The heater 26 defines the energizing state 30 when the PSC motor 50 receives a level 80 of motor current 32 that is above the first threshold current 56 and below the second threshold current 58.

Figure 2:
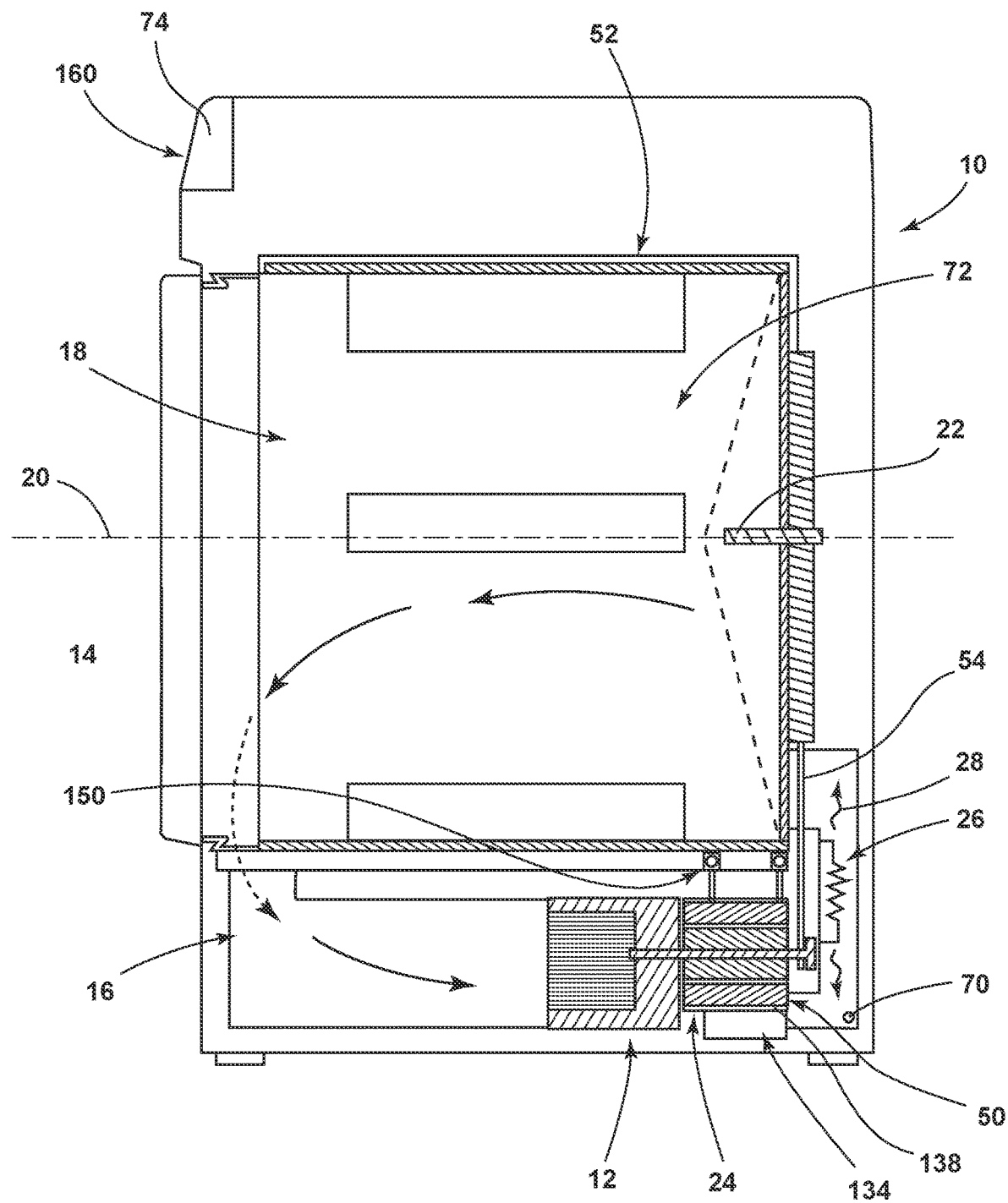
FIG. 2 is a cross-sectional view of the appliance of FIG. 1 taken along line II-II.
Figure 3:
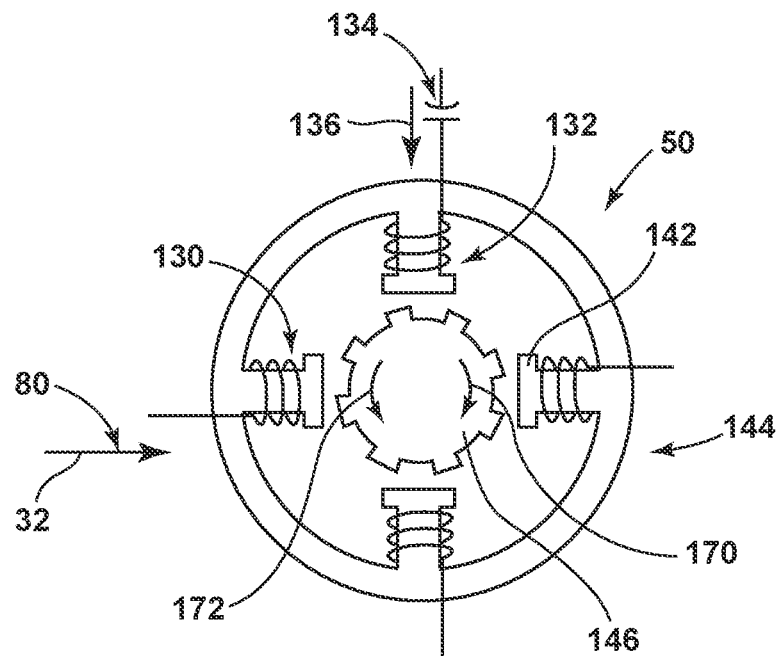
FIG. 3 is a schematic illustration of a permanent split capacitor motor showing the primary windings and the auxiliary windings that are energized for operating a rotor.
Figure 4:
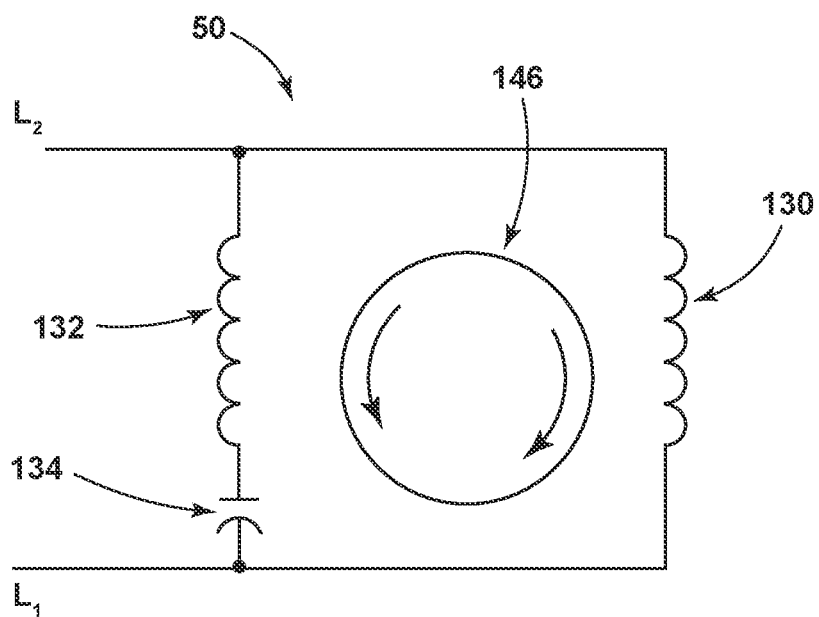
FIG. 4 is a schematic diagram illustrating circuitry for the permanent split capacitor motor.
Figure 5:
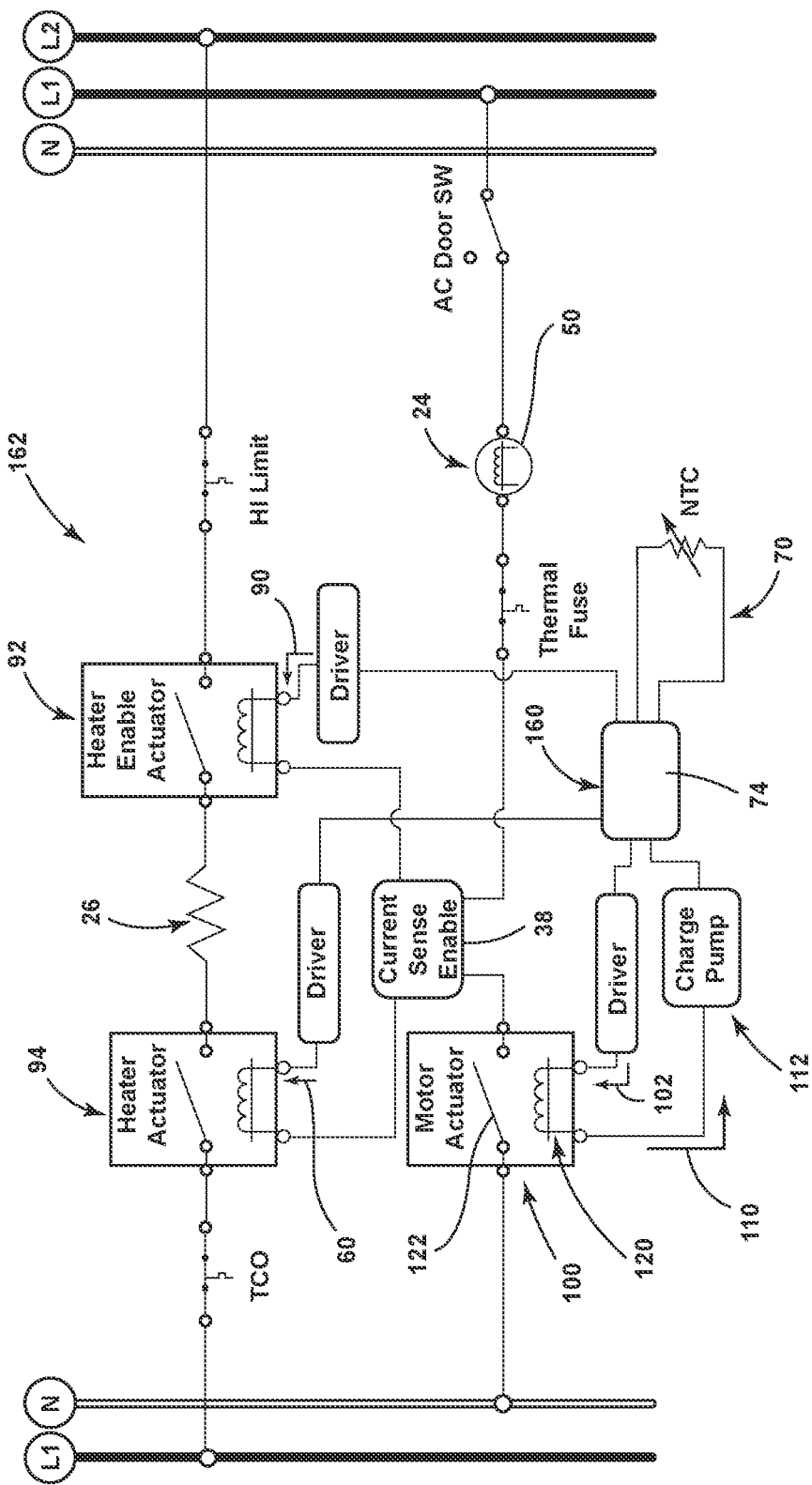
FIG. 5 is a schematic diagram illustrating circuitry for the temperature control system that incorporates the permanent split capacitor motor.

As is exemplified in FIG. 2, the PSC motor 50 is configured to contemporaneously operate each of the blower 12 and the drive shaft 22 for the rotating drum 18. Also, the PSC motor 50 is able to operate the drive shaft 22 and the rotating drum 18 in clockwise and counterclockwise directions 170, 172 about the rotational axis 20 of the drive shaft 22.

Referring again to FIGS. 2-6, the PSC motor 50 is coupled with the current sensor 38 that detects both the presence of the motor current 32 as well as a level 80 of the motor current 32 in relation to the predetermined motor current range 34.

As discussed previously, the PSC motor 50 can be installed within the laundry appliance 10 as an aftermarket component. It is also contemplated that the PSC motor 50 can be installed within the appliance 10 during manufacture.

When installed during manufacture, various controls and circuitry for operating the heater 26, the blower 12 and the motor are each installed within the main board for the appliance 10 during manufacture.

As exemplified in FIGS. 1-6, the circuit 162 that operates the PSC motor 50 and heater 26 includes a current sensor 38 that detects the presence of the motor current 32. The current sensor 38 also detects a level 80 of the motor current 32 in relation to the predetermined motor current range 34. According to various aspects of the device, the current sensor 38 can also detect varying levels 80 of the motor current 32 in relation to the predetermined motor current range 34. By way of example, and not limitation, at the initial phases of an atypical operation within the appliance 10, the drum 18 may begin to slow down as a result of an obstruction or other atypical condition. During this slowing of the rotating drum 18, the motor current 32 delivered to the PSC motor 50 may increase over time. The current sensor 38 may detect this increase of motor current 32 and provide a warning, signal, or other indicia to a display of the appliance 10 for alerting the user of the appliance 10 that the laundry appliance 10 is not operating as intended. Accordingly, in such an embodiment, the current sensor 38 can detect when the motor current 32 is outside the predetermined motor current range 34, and also when the motor current 32 is approaching the outer boundaries of the predetermined motor current range 34.

Referring now to FIGS. 1-7, having described various aspects of the device, method 400 is disclosed for operating a heater 26 for a laundry appliance 10. According to the method 400, step 402 includes detecting a level 80 of a motor current 32 delivered to a PSC motor 50 that contemporaneously drives each of a blower 12 and a rotating drum 18. According to the method 400, a heater 26 is energized to define an energizing state 30 when the level 80 of the motor current 32 is above a first threshold current 56 indicative of the PSC motor 50 operating and also below the second threshold current 58 that is typically indicative of a stalled condition 180 of the PSC motor 50 (step 404). The stalled condition 180 of the PSC motor 50 can be caused by the rotating drum 18 and/or the blower 12 stopping rotation. This stoppage of rotation can be the result of a blockage, overload or other malfunction of the appliance 10. According to the method 400, step 406 includes activating the heater 26 when in the energizing state 30 and when an activation signal 60 is delivered to the heater 26. As discussed above, method 400 can also include a step 408 that incudes switching the heater 26 to an idle state 36 when the motor current 32 is above the second threshold current 58 that is indicative of the stalled condition 180 of a PSC motor 50.

Because the stalled condition 180 results in the stoppage of the blower 12, process air 14 is not moved through the airflow path 16. As a consequence, if the heater 26 is able to be activated during this stalled condition 180, a build-up of heat 28 may result around the location of the heater 26. Accordingly, the system disclosed herein provides for an electronic control 160 for deactivating the heater 26 in the case of a stalling or other stoppage of the PSC motor 50 that also results in a stoppage of the blower 12 and/or the rotating drum 18. It should be understood that the stoppage of the blower 12 and/or the rotating drum 18 results in an increase of motor current 32 at or near the PSC motor 50. The current sensor 38 detects this increased level 80 of electrical current and recognizes the heater 26 is to be placed in the idle state 36 to prevent the build-up of heat 28 within the relevant portion of the airflow path 16.

According to various aspects of the device, it is contemplated that the heater 26 can be in the form of an electrically resistive heater 26, a condenser of a heat pump system, or other similar heating mechanism.

According to various aspects of the device, the use of the PSC motor 50 can be within various laundry appliances 10. By way of example, and not limitation, use of the PSC motor 50 can be within a laundry appliance 10 having a drum 18 that is at least approximately 7.0 cubic feet in volume. The PSC motor 50 described herein can also be used in drums 18 having a larger or smaller processing chamber 72 within the rotating drum 18.

According to one aspect, a laundry appliance includes a blower that operates to selectively deliver process air through an airflow path. A drive shaft rotates about a rotational axis to operate a rotating drum. The rotating drum defines a portion of the airflow path. A permanent split capacitor motor selectively activates to operate the blower and the drive shaft. A heater is in communication with the airflow path that selectively delivers heat to the airflow path. The heater defines an energizing state when the permanent split capacitor motor includes a motor current having a motor current level that is above a first threshold current and below a second threshold current.

According to another aspect, the heater in the energizing state is configured to receive an activation signal for delivering heat to the airflow path.

According to yet another aspect, the heater is configured to define an idle state when the permanent split capacitor motor includes a motor current level that is one of at or below the first threshold current, and at or above the second threshold current.

According to still another aspect, the heater in the idle state is configured to remain deactivated.

According to another aspect, the permanent split capacitor motor is configured to contemporaneously operate the blower and the drive shaft.

According to yet another aspect, the permanent split capacitor motor is configured to operate the rotating drum in a clockwise direction and a counterclockwise direction about the rotational axis of the drive shaft.

According to still another aspect, the permanent split capacitor motor is coupled with a current sensor that detects a presence of the motor current and the motor current level.

According to another aspect, the current sensor determines whether the motor current level is between the first and second threshold current.

According to yet another aspect, the heater includes a heater enable actuator that is coupled with the current sensor and a heater actuator that is coupled with a temperature sensor, wherein the heater is activated when each of the heater enable actuator and the heater actuator are closed.

According to still another aspect, the permanent split capacitor motor includes a capacitor that is attached to a housing of the permanent split capacitor motor.

According to another aspect, the permanent split capacitor motor is configured to be installed to operate the blower and the drive shaft as an aftermarket component.

According to yet another aspect, a laundry appliance includes a blower that selectively delivers process air through an airflow path. A rotating drum defines a portion of the airflow path. The rotating drum is attached to a drive shaft that rotates the rotating drum about a rotational axis. The blower and the drive shaft are operated by a common motor. A heater selectively delivers heat to the airflow path. The heater defines an energizing state when a motor current delivered to the common motor is within a predetermined motor current range that is indicative of the common motor operating. The heater defines an idle state when the motor current is outside of the predetermined motor current range.

According to still another aspect, the predetermined motor current range includes a motor current that is above a first threshold current and below a second threshold current.

According to another aspect, the common motor includes a primary winding, an auxiliary winding and a capacitor that is coupled with the auxiliary winding.

According to yet another aspect, the heater in the energizing state is configured to receive an activation signal that activates the heater to deliver heat to the airflow path.

According to still another aspect, a current sensor detects a presence of the motor current and detects a level of the motor current in relation to the predetermined motor current range.

According to another aspect, the capacitor is attached to a housing of the common motor.

According to yet another aspect, the common motor is configured to be installed to operate the blower and the drive shaft as an aftermarket component.

According to still another aspect, a method for operating a heater for a laundry appliance includes detecting a level of a motor current delivered to a permanent split capacitor motor that contemporaneously drives a blower and a rotating drum. The heater is energized to define an energizing state when the level of the motor current is above a first threshold current indicative of the permanent split capacitor motor operating and below a second threshold current indicative of a stalled condition of the permanent split capacitor motor. The heater is activated when in the energizing state and when an activation signal is delivered to the heater.

According to another aspect, the step of activating the heater includes measuring a temperature proximate one of the heater and the drum using a thermocouple.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance comprising:
   a drive shaft having a first end coupled to a blower that operates relative to an airflow path, the drive shaft including a second end coupled to a rotating drum that operates relative to the airflow path;
   a permanent split capacitor motor that selectively activates to operate the drive shaft about a rotational axis for driving the blower and the rotating drum; and
   a heater in communication with the airflow path that selectively delivers heat to the airflow path, wherein the heater defines an energizing state when the permanent split capacitor motor includes a motor current having a motor current level that is above a lower threshold current and below an upper threshold current, wherein the heater defines an idle state when the permanent split capacitor motor includes a motor current level that is outside of a current range defined between the lower threshold current and the upper threshold current, and wherein the motor current level outside of the current range is indicative of the permanent split capacitor motor, the rotating drum and the blower defining one of a stalled condition and an inactive condition.

2. The appliance of claim 1, wherein the first end of the drive shaft is coupled with the blower that operates to selectively deliver process air through the airflow path.

3. The appliance of claim 2, wherein the second end of the drive shaft is coupled with the rotating drum, wherein the rotating drum defines a portion of the airflow path.

4. The appliance of claim 1, wherein the heater in the energizing state receives an activation signal for delivering heat to the airflow path.

5. The appliance of claim 1, wherein the heater in the idle state is deactivated.

6. The appliance of claim 3, wherein the permanent split capacitor motor is configured to contemporaneously operate the blower and the rotating drum.

7. The appliance of claim 3, wherein the permanent split capacitor motor is configured to operate the rotating drum in a clockwise direction and a counterclockwise direction about the rotational axis of the drive shaft.

8. The appliance of claim 1, wherein the permanent split capacitor motor is coupled with a current sensor that detects a presence of the motor current and the motor current level.

9. The appliance of claim 8, wherein the current sensor determines whether the motor current level is between the lower threshold current and the upper threshold current.

10. The appliance of claim 8, wherein the heater includes a heater enable actuator that is coupled with the current sensor and a heater actuator that is coupled with a temperature sensor, wherein the heater is activated when each of the heater enable actuator and the heater actuator are closed.

11. The appliance of claim 1, wherein the permanent split capacitor motor includes a capacitor that is attached to a housing of the permanent split capacitor motor.

12. The appliance of claim 3, wherein the permanent split capacitor motor is configured to be installed to operate the blower and the drive shaft as an aftermarket component.

13. An appliance comprising:
 a blower that selectively delivers process air through an airflow path;
 a rotating drum that defines a portion of the airflow path, wherein rotation of the blower and the rotating drum are operated by a permanent split capacitor motor; and
 a heater that selectively delivers heat to the airflow path, wherein the heater defines an energizing state when a motor current delivered to the permanent split capacitor motor is within a predetermined motor current range that is indicative of the permanent split capacitor motor operating, wherein the heater defines an idle state when the motor current is outside of the predetermined motor current range, wherein the motor current outside of the predetermined motor current range is indicative of the permanent split capacitor motor, the rotating drum and the blower defining one of a stalled condition and an inactive condition.

14. The appliance of claim 13, wherein the predetermined motor current range includes a motor current that is above a first threshold current and below a second threshold current.

15. The appliance of claim 13, wherein the permanent split capacitor motor includes a primary winding, an auxiliary winding and a capacitor that is coupled with the auxiliary winding.

16. The appliance of claim 13, wherein the heater in the energizing state is configured to receive an activation signal that activates the heater to deliver heat to the airflow path.

17. The appliance of claim 13, further comprising:
 a current sensor that detects a presence of the motor current and detects a level of the motor current in relation to the predetermined motor current range.

18. The appliance of claim 15, wherein the capacitor is attached to a housing of the permanent split capacitor motor.

19. A method for operating a heater for an appliance including steps of:
 detecting a level of a motor current delivered to a permanent split capacitor motor that drives a drive shaft that is coupled with a blower and a rotating drum;
 energizing the heater to define an energizing state when the level of the motor current is above a lower threshold current and below an upper threshold current, the lower threshold current being indicative of the permanent split capacitor motor operating and the upper threshold current being indicative of a stalled condition of the permanent split capacitor motor;
 activating the heater when in the energizing state and when an activation signal is delivered to the heater; and
 deactivating the heater when the level of the motor current is one of below the lower threshold current indicative of the permanent split capacitor motor being inactive and above the upper threshold current indicative of the permanent split capacitor being active and the rotating drum defining the stalled condition.

* * * * *